United States Patent
Karpman et al.

(10) Patent No.: US 9,327,570 B2
(45) Date of Patent: May 3, 2016

(54) BALL JOINT ASSEMBLY FOR A CONTROL ARM

(71) Applicant: Federal-Mogul Motorparts Corporation, Southfield, MI (US)

(72) Inventors: Alexander Karpman, Ballwin, MO (US); Thomas Byrnes, St. Charles, MO (US)

(73) Assignee: Federal-Mogul Motorparts Corporation, Southfield, MI (US)

( * ) Notice: Subject to any disclaimer, the term of this patent is extended or adjusted under 35 U.S.C. 154(b) by 0 days.

(21) Appl. No.: 14/580,572

(22) Filed: Dec. 23, 2014

(65) Prior Publication Data

US 2015/0251511 A1     Sep. 10, 2015

Related U.S. Application Data

(60) Provisional application No. 61/947,760, filed on Mar. 4, 2014.

(51) Int. Cl.
*B60G 7/00* (2006.01)
*B60G 7/02* (2006.01)
(Continued)

(52) U.S. Cl.
CPC *B60G 7/005* (2013.01); *B60G 7/02* (2013.01); *F16C 11/0604* (2013.01); *F16C 11/0614* (2013.01); *F16C 11/0619* (2013.01);
(Continued)

(58) Field of Classification Search
CPC .... B60G 7/005; B60G 7/02; B60G 2204/416; B60G 2204/1431; B60G 2200/1424; B60G 2206/91; F16C 11/0604; F16C 11/0614; F16C 11/0619; F16C 11/0623; F16C 11/0661; F16C 11/0671; F16C 11/0685; F16C 11/0695; F16C 23/045; F16C 2226/76; Y10T 29/49648
See application file for complete search history.

(56) References Cited

U.S. PATENT DOCUMENTS 1,062,197 A     5/1913   Stegeman
1,065,483 A     6/1913   Turner
(Continued)

FOREIGN PATENT DOCUMENTS

DE         01105292 B     4/1961
DE     102011000660 A1    8/2012
(Continued)

OTHER PUBLICATIONS

International Search Report, mailed Feb. 25, 2015 (PCT/US2014/072076).

*Primary Examiner* — Laura Freedman
(74) *Attorney, Agent, or Firm* — Robert L. Stearns; Dickinson Wright, PLLC

(57) ABSTRACT

The ball joint assembly includes a housing and a bearing which has an inner surface that extends between open ends and which presents a bearing surface that surrounds a generally spherically-shaped cavity. A stud is provided which has an outer surface with a generally ball-shaped portion that has at least two curved surfaces and at least two recessed surfaces. The bearing has a passage with a slots that extend from one of the ends to the cavity. The ball-shaped portion of the stud is insertable into the cavity of the bearing by aligning the curved surfaces of the stud with the slots of the passage. The stud is rotatable while the ball-shaped portion of the stud is positioned within the cavity to establish slidable contact between the curved surfaces of the stud and the bearing surface of the bearing to allow pivoting of the stud relative to the bearing.

13 Claims, 10 Drawing Sheets

(51) Int. Cl.
  *F16C 11/06* (2006.01)
  *F16C 23/04* (2006.01)

(52) U.S. Cl.
  CPC ......... *F16C11/0671* (2013.01); *F16C 11/0685* (2013.01); *F16C 23/045* (2013.01); *B60G 2200/1424* (2013.01); *B60G 2204/1431* (2013.01); *B60G 2204/416* (2013.01); *B60G 2206/91* (2013.01); *F16C 2226/76* (2013.01); *Y10T 29/49648* (2015.01)

(56) References Cited

U.S. PATENT DOCUMENTS

| | | | |
|---|---|---|---|
| 2,047,885 A | 7/1936 | Riebe | |
| 2,309,281 A | 1/1943 | Steele | |
| 2,345,564 A | 4/1944 | Allen | |
| 2,478,660 A | 8/1949 | Keahey | |
| 2,971,787 A | 2/1961 | Lincoln | |
| 3,020,101 A * | 2/1962 | McCaslin | 384/208 |
| 3,160,449 A | 12/1964 | Scott | |
| 3,371,398 A | 3/1968 | Patterson et al. | |
| 3,803,685 A | 4/1974 | Muhn | |
| 3,831,245 A | 8/1974 | Amos | |
| 3,965,554 A | 6/1976 | Amos | |
| 4,411,545 A | 10/1983 | Roberge | |
| 4,765,757 A | 8/1988 | Hartl | |
| 4,979,844 A | 12/1990 | Teramachi | |
| 5,070,609 A | 12/1991 | Teramachi | |
| 5,242,228 A * | 9/1993 | Hattori | 384/145 |
| 5,265,965 A | 11/1993 | Harris et al. | |
| 5,480,231 A * | 1/1996 | Sasaki et al. | 384/206 |
| 5,482,379 A | 1/1996 | Harris et al. | |
| 5,494,357 A * | 2/1996 | Harris et al. | 384/208 |
| 5,755,526 A * | 5/1998 | Stanevich | 403/122 |
| 5,931,597 A * | 8/1999 | Urbach | 403/134 |
| 5,951,195 A | 9/1999 | Ruholl | |
| 6,247,868 B1 | 6/2001 | Burton | |
| 6,520,682 B2 | 2/2003 | Kletzli et al. | |
| 6,988,830 B2 | 1/2006 | Maasch et al. | |
| 7,223,019 B2 | 5/2007 | Hoppe | |
| 7,452,154 B2 * | 11/2008 | Aoshima et al. | 403/122 |
| 7,568,841 B2 | 8/2009 | Wood, Jr. et al. | |
| 8,337,087 B2 | 12/2012 | Blachon | |
| 2002/0168122 A1 | 11/2002 | Kletzli et al. | |
| 2006/0062502 A1* | 3/2006 | Hupp | 384/213 |
| 2007/0122232 A1* | 5/2007 | Buchner et al. | 403/122 |
| 2008/0056812 A1 | 3/2008 | Coenen | |
| 2009/0080818 A1 | 3/2009 | Sasaki et al. | |
| 2010/0247232 A1* | 9/2010 | Lin | 403/76 |
| 2012/0177437 A1 | 7/2012 | Bongartz et al. | |
| 2013/0294816 A1 | 11/2013 | Broeker et al. | |
| 2013/0328284 A1* | 12/2013 | Byrnes | 280/124.151 |

FOREIGN PATENT DOCUMENTS

| | | |
|---|---|---|
| EP | 0060757 A1 | 9/1982 |
| WO | 2013184221 A1 | 12/2013 |

\* cited by examiner

BALL JOINT ASSEMBLY FOR A CONTROL ARM

CROSS-REFERENCE TO RELATED APPLICATION

This application claims the benefit of U.S. Provisional Patent Application Ser. No. 61/947,760, filed Mar. 4, 2014, entitled "Bushing Assembly", the entire disclosure of the application being considered part of the disclosure of this application and hereby incorporated by reference.

BACKGROUND OF THE INVENTION

1. Field of the Invention

The present invention is related generally to bushing assemblies and more particularly to metal bushing assemblies having a stud and a housing which is rotatable relative to the stud.

2. Related Art

Many automotive vehicles today employ suspension systems commonly known as MacPherson strut systems or double-wishbone systems. Such systems typically include a lower control arm (also referred to as an A-arm) which pivots relative to the vehicle's frame to allow a wheel and tire to move upwardly and downwardly relative to the frame during cornering or in response to encountering an object, such as a pot hole in the road.

A lower control arm 10 for a Macpherson strut type of suspension system is generally shown in FIG. 1. The lower control arm 10 includes a ball joint 11 for connection with a steering knuckle (not shown) of a hub assembly and a pair of bushings 12, 13 for guiding the pivoting movement of the lower control arm 10 relative to the vehicle's frame (not shown). One of the bushings is a horizontal bushing 12 which is configured to pivot relative to the vehicle frame about longitudinally extending bolt (not shown). The other bushing 13 is a vertical bushing which is configured to pivot relative to the vehicle frame about a vertically extending bolt (not shown).

Referring now to FIGS. 2A-C, an conventional vertical bushing 13 is generally shown. As best shown in FIG. 2C, the conventional vertical bushing 13 has an outer metallic sleeve 14, which is press fit into an opening in the lower control arm 10 (shown in FIG. 1), a rubber cushion 15 and an inner metallic sleeve 16. The rubber cushion 15 extends radially between and interconnects the outer and inner metallic sleeves 14, 16. In operation, the inner metallic sleeve 16 pivots or twists relative to the outer metallic sleeve 14 during movement of the vehicle suspension, such as when the vehicle encounters a pot hole in the road. The rubber cushion 15 deforms elastically to allow the pivoting movement between these sleeves 14, 16 and absorbs/deforms due to a radial load. As such, during operation of the vehicle, the rubber cushion 15 is exposed to both a radial load and a twisting load motion. Exposure to the radial load and twisting motion leads to deterioration in the rubber cushion 15, thereby reducing the life of the vertical bushing 13.

SUMMARY OF THE INVENTION

One aspect of the invention provides for an improved ball joint assembly for allowing rotation of a control arm relative to a vehicle frame. The ball joint assembly includes a housing which is adapted for receipt within an opening of the control arm. The ball joint assembly further includes a bearing which has an inner surface that extends between open first and second ends and which presents a curved bearing surface that surrounds a generally spherically-shaped cavity. A stud is provided which has an outer surface with a generally ball-shaped portion that has at least two curved surfaces and at least two recessed surfaces. The bearing further includes a passage with a pair of slots that extend from one of the open ends of the bearing to the spherically-shaped cavity. The generally ball-shaped portion of the stud is insertable into the spherically-shaped cavity of the bearing by aligning the curved surfaces of the stud with the slots of the passage. The stud is rotatable while the ball-shaped portion of the stud is positioned within the spherically-shaped cavity of the bearing to establish slidable contact between the curved surfaces of the stud and the curved bearing surface of the bearing to allow pivoting of the stud relative to the bearing.

The improved ball joint assembly exhibits reduced wear and thus has an improved operating life as compared to the vertical bushing assemblies that are typically found in such control arms. Additionally, the ball joint assembly can be manufactured at low cost and can be sold as an aftermarket part as a replacement for worn bushings.

Another aspect of the present invention provides for a method of making a ball joint assembly. The method includes the step of preparing a housing and a bearing. The bearing has a curved bearing surface that surrounds a generally spherically shaped cavity and has a passage with two slots that extend from an end of the bearing to the spherically shaped cavity. The method proceeds with the step of preparing a stud that includes a generally ball-shaped portion that has at least two curved surfaces and at least two recessed surfaces. The method continues with the step of aligning the curved surfaces of the ball-shaped portion of the stud with the slots of the passage of the bearing. The method proceeds with the step of guiding the ball shaped portion of the stud into the spherically shaped cavity of the bearing. The method continues with the step of guiding the ball shaped portion of the stud into the spherically shaped cavity of the bearing. The method proceeds with the step of rotating the stud relative to the bearing to establish slidable contact between the curved surfaces of the ball-shaped portion with the bearing surface of the bearing to allow pivoting of the stud relative to the bearing.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
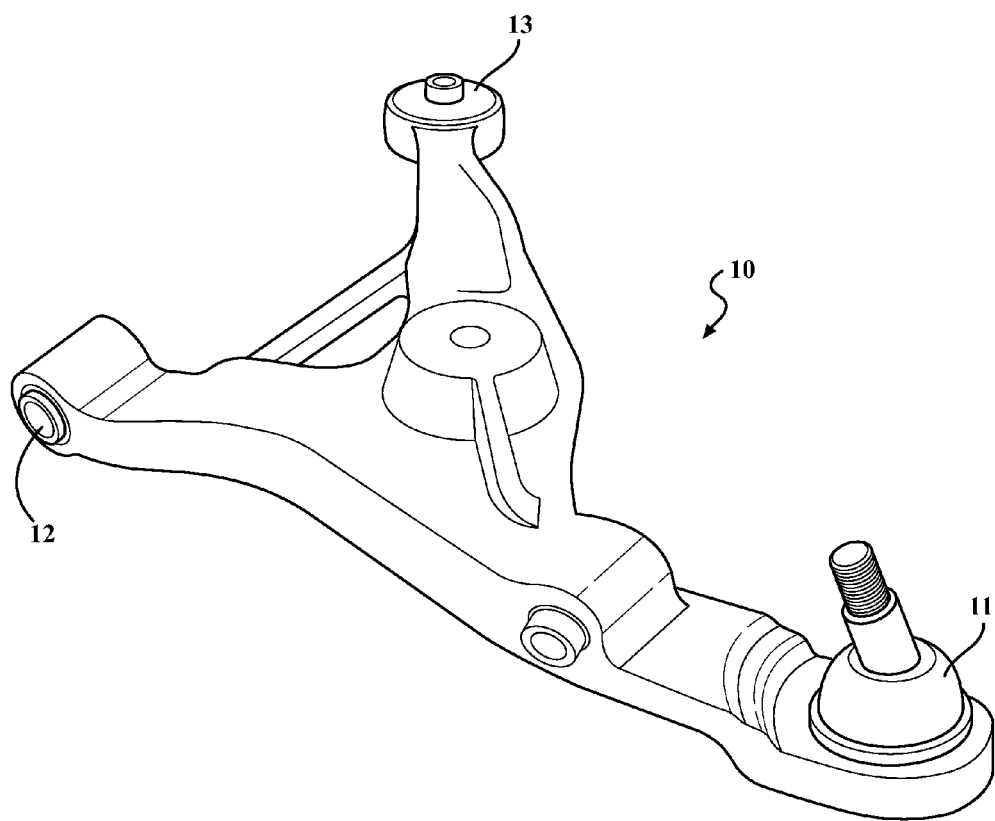
FIG. 1 is a perspective view of one known control arm assembly.
Figure 2A:
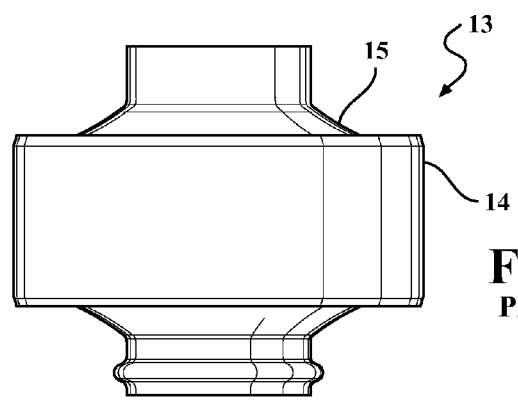
FIG. 2A is a front elevation view of an exemplary vertical bushing from the control arm of FIG. 1.
Figure 2B:
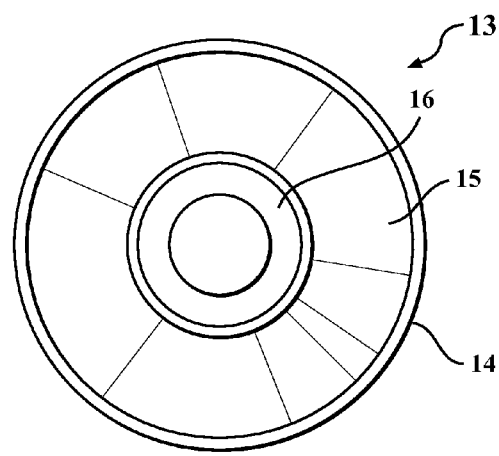
FIG. 2B is a top elevation view of the vertical bushing of FIG. 2A.
Figure 2C:
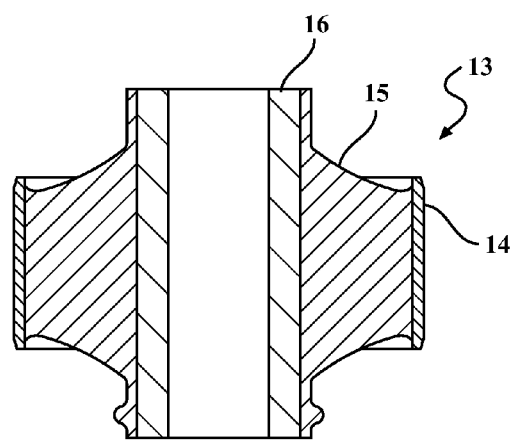
FIG. 2C is a cross-sectional view of the vertical bushing of FIGS. 2A and 2B and taken along Line C-C of FIG. 2B.
Figure 3:
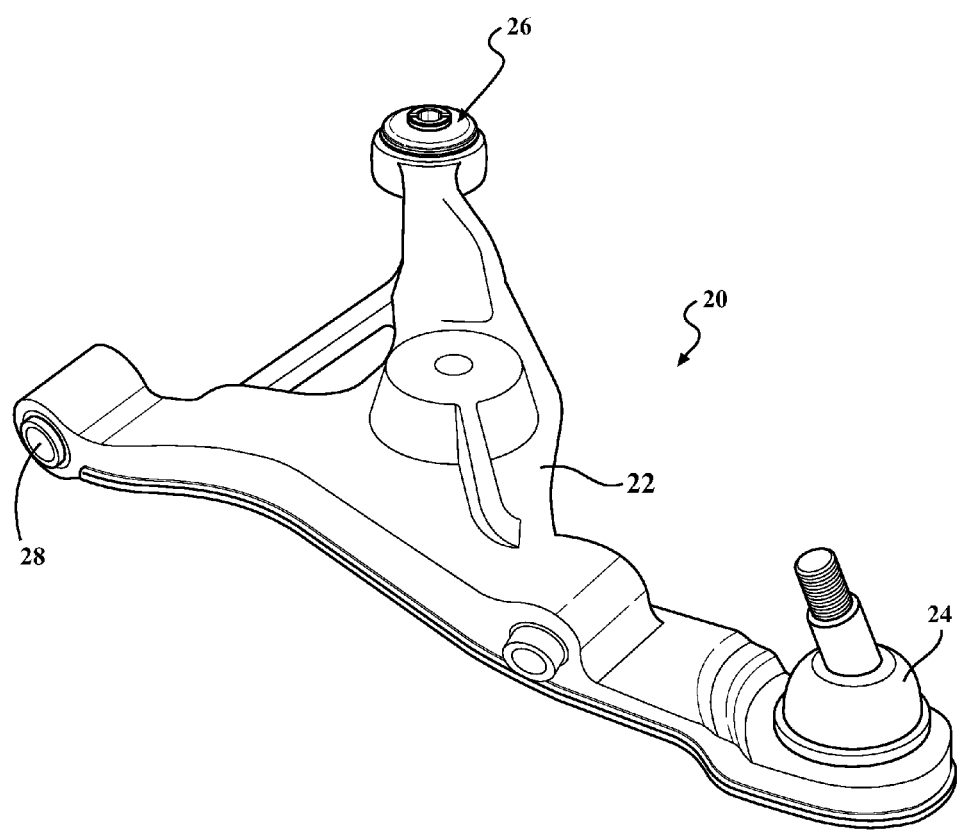
FIG. 3 is a perspective view of an exemplary embodiment of an improved control arm assembly.
Figure 5:
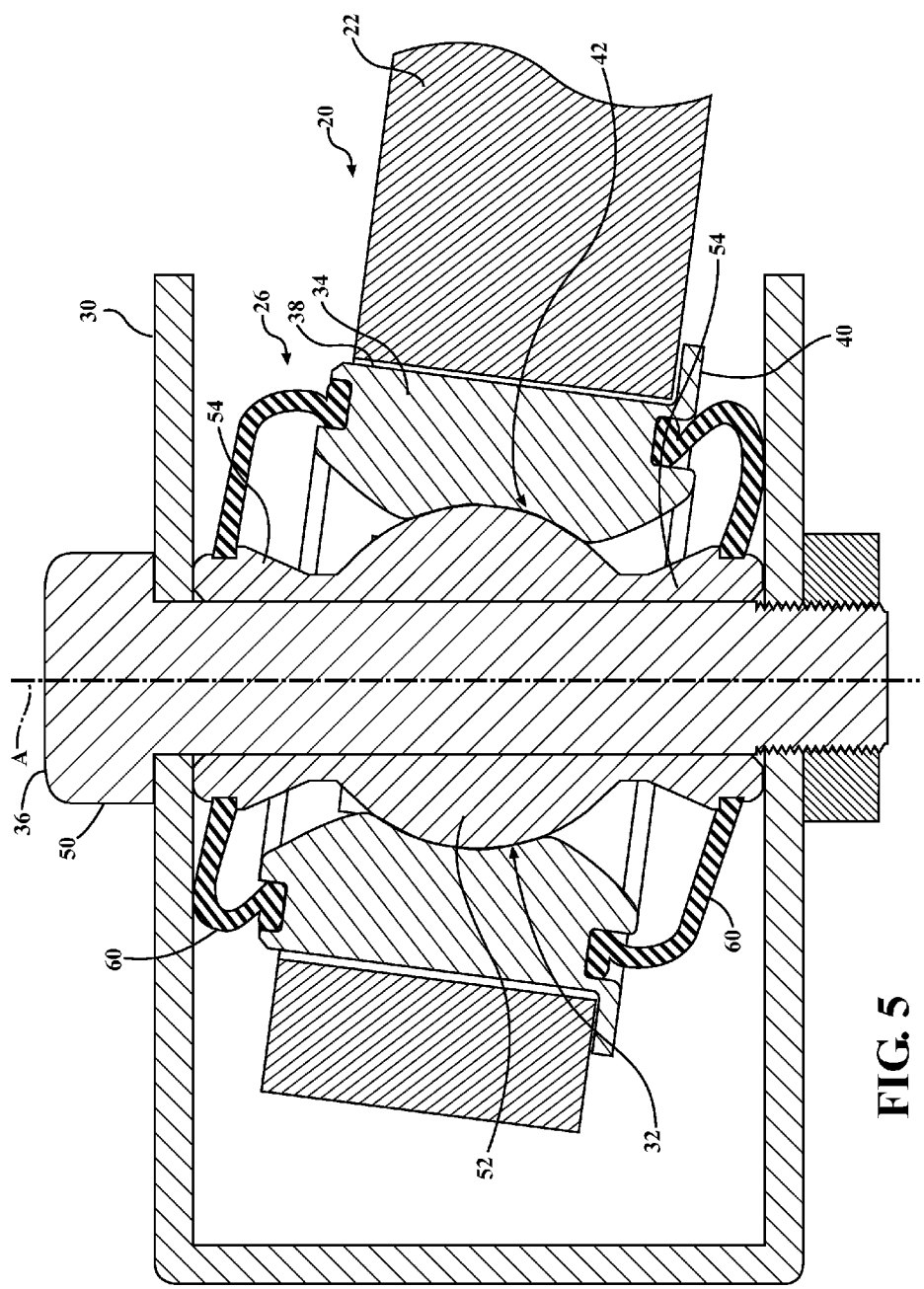
FIG. 5 is another cross-sectional view of the control arm assembly of FIG. 3 connected with a vehicle frame and in a different rotational position than FIG. 4.
Figure 6:
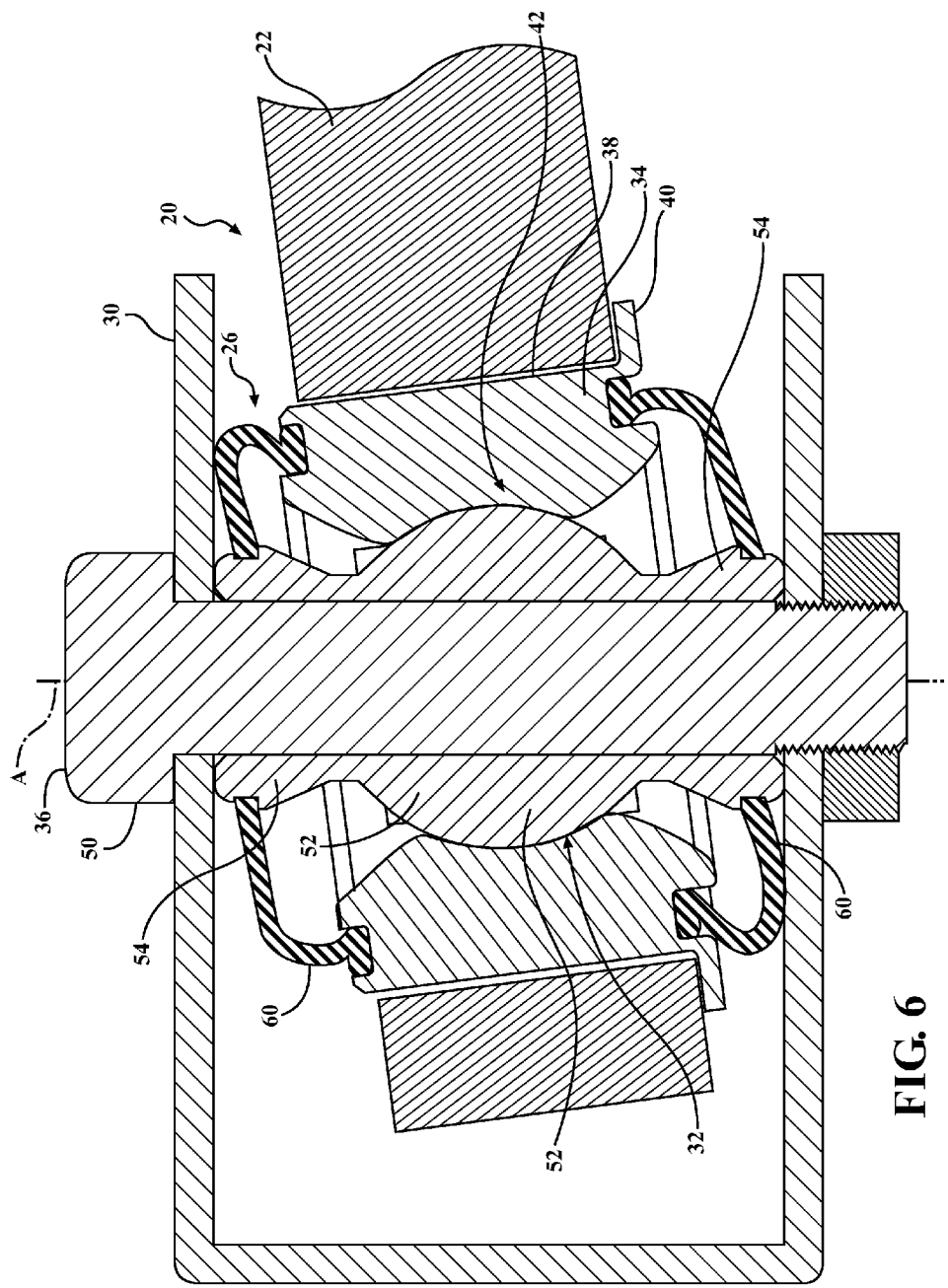
FIG. 6 is yet another cross-sectional view of the control arm assembly of FIG. 3 connected with a vehicle frame and in a different rotational position than FIGS. 4 and 5.
Figure 7:
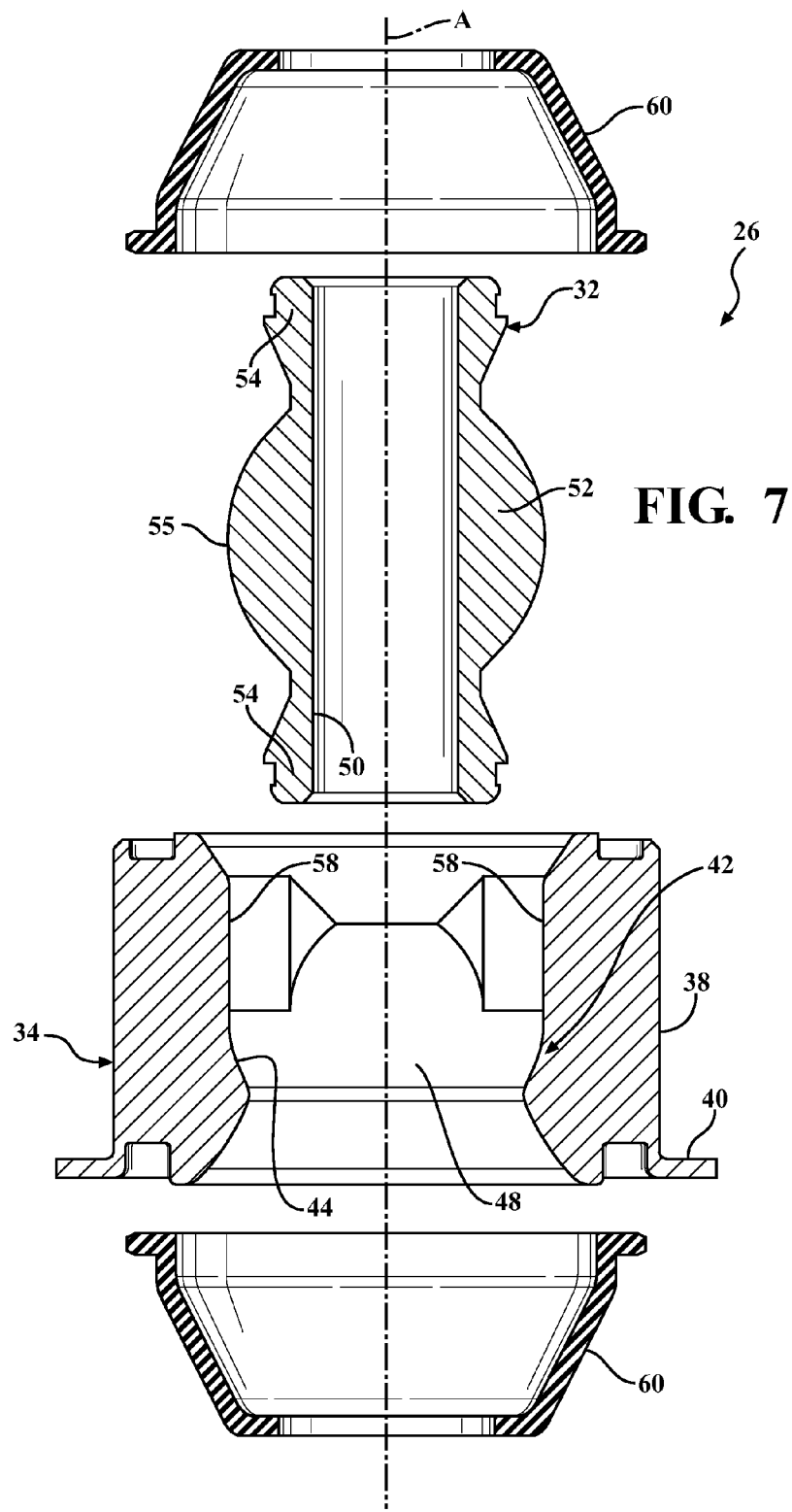
FIG. 7 is a cross-sectional and exploded view of an exemplary embodiment of an improved ball joint assembly of the control arm of FIG. 3.
Figure 8:
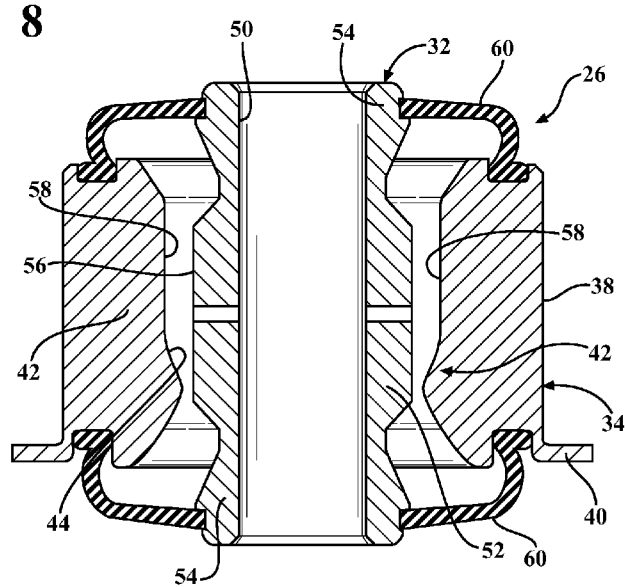
FIG. 8 is a cross-sectional view of the ball joint assembly of FIG. 7.
Figure 10:
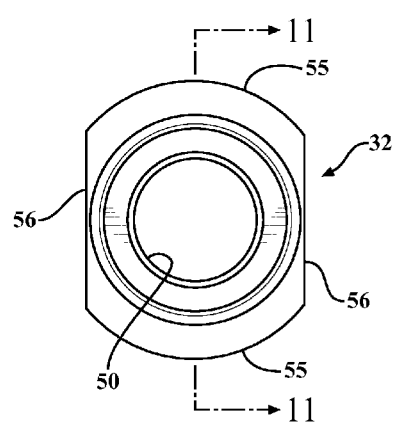
FIG. 10 is a top elevation view of the stud of FIG. 9.
Figure 9:
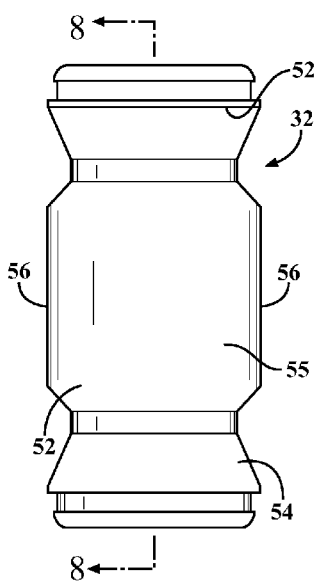
FIG. 9 is a front elevation view of an exemplary embodiment of a stud of the ball joint assembly of FIG. 7.
Figure 11:
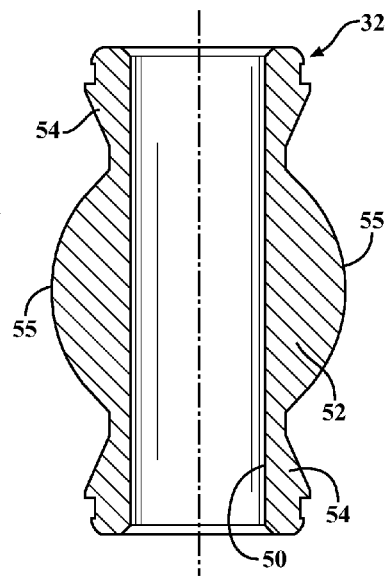
FIG. 11 is a cross-sectional view of the stud of FIG. 9 and taken along Line 11-11 of FIG. 10.
Figure 12:
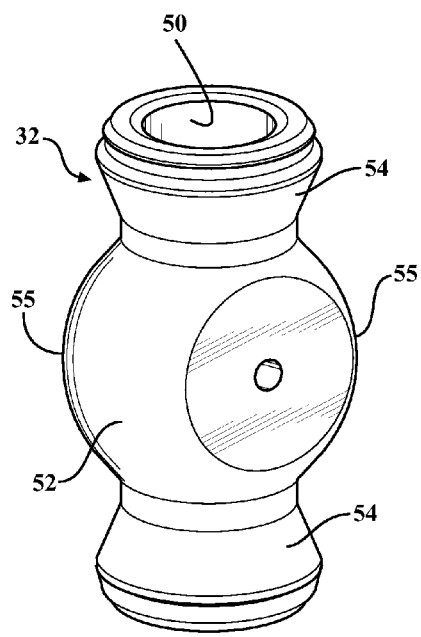
FIG. 12 is a perspective view of the stud of FIG. 9.

Referring to FIGS. 3, an exemplary embodiment of a control arm assembly 20 for a vehicle suspension system is generally shown. The control arm assembly 20 includes a body 22 and a ball socket assembly 24 for attachment with a steering knuckle (not shown) of a vehicle. The control arm assembly 20 further includes a ball joint assembly 26 and a horizontal bushing 28 which are configured to join the control arm body 22 with a vehicle frame 30 (shown in FIGS. 6-8). As shown in FIGS. 6-8, the ball joint assembly 26 allows the control arm body 22 to pivot relative to the vehicle frame 30 during operation of the vehicle, for example, in response to a wheel on the vehicle encountering an obstacle such as a pothole or in response to the vehicle rolling while cornering at high speeds. FIG. 5 shows the control arm body 22 in one pivoting position, and FIG. 6 shows the control arm body 22 in another pivoting position. The ball joint assembly 26 includes a stud 32 which is fixed to the vehicle frame 30 with a fastener and a housing 34 which is engaged with the control arm body 22 and which is pivotable relative to the stud 32. In the exemplary embodiment, the fastener which fixes the stud 32 with the vehicle frame 30 is a bolt 36. However, any suitable type of fastener or connecting means may be employed.

Figure 4:
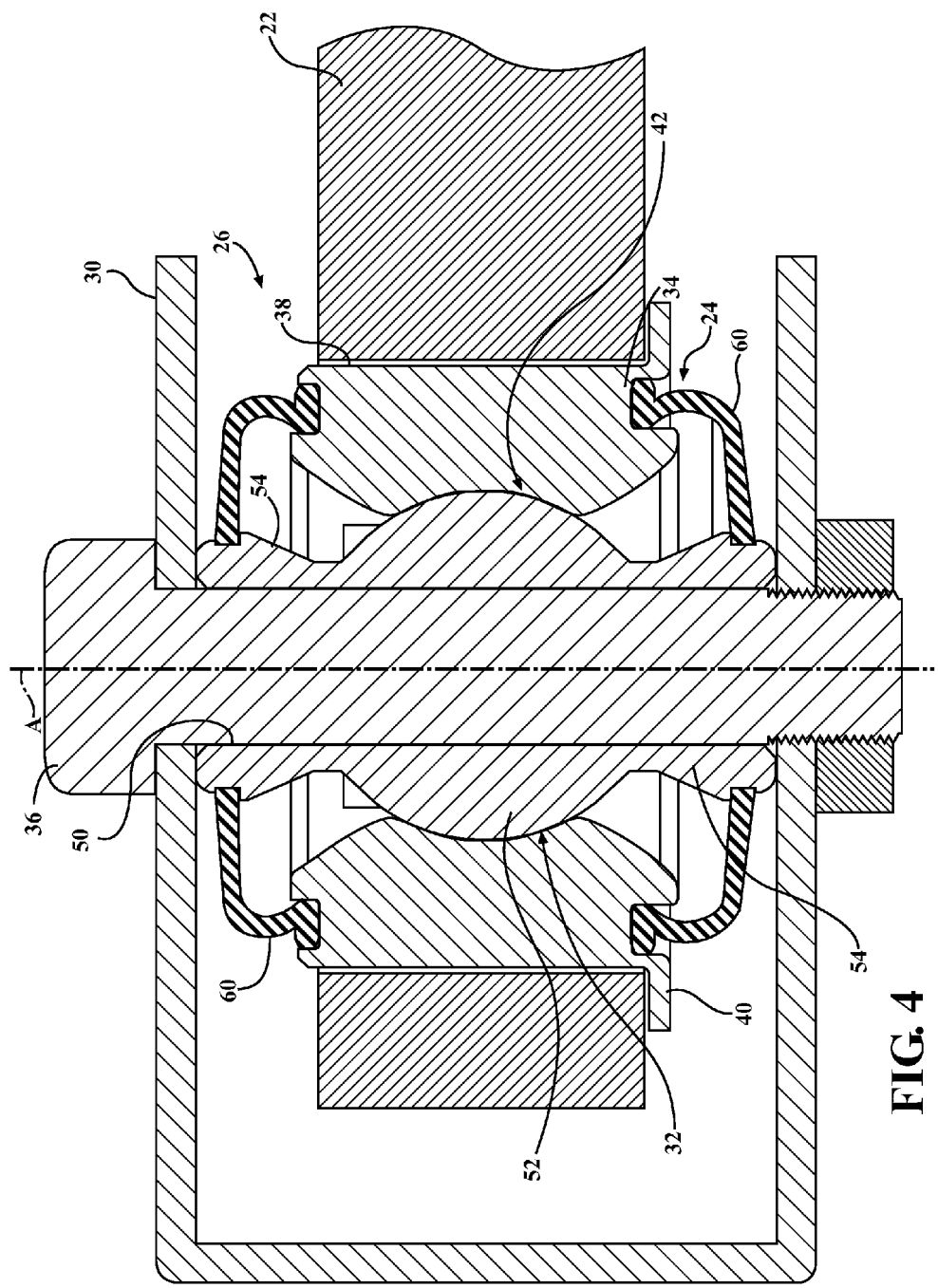
FIG. 4 is a cross-sectional view of the control arm assembly of FIG. 3 and connected with a vehicle frame.

As shown in FIG. 4, the housing 34 of the exemplary embodiment has an exterior surface 38 which extends along an axis A and is shaped and sized to be press-fit into an opening of the control arm body 22. One axial end of the exterior surface 38 includes a radially outwardly extending flange 40. During installation of the ball joint assembly 26 into the control arm, the flange 40 defines a stopping point to ensure that the ball joint assembly 26 is properly installed in the opening of the control arm body 22. The housing 34 is preferably made of one integral piece of metal, such as steel.

The ball joint assembly 26 further includes a bearing 42 which establishes the pivoting relationship between the housing 34 and the stud 32. In the exemplary embodiment, the bearing 42 and the housing 34 are formed as one integral piece of metal. However, it should be appreciated that the bearing 42 and the housing 34 could alternately be constructed as separate elements which are formed separately and are subsequently joined together.

Figure 13:
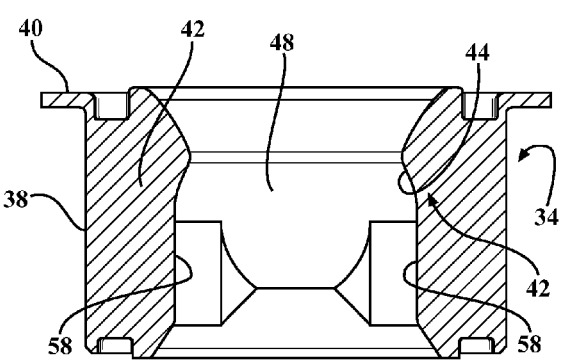
FIG. 13 is a cross-sectional view of a housing of the ball joint assembly of FIG. 7.
Figure 14:
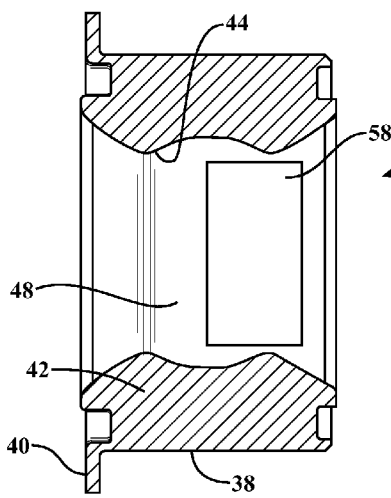
FIG. 14 is another cross-sectional view of the housing of the ball joint assembly of FIG. 7 and taken from a different perspective than FIG. 13.

As shown in FIGS. 13 and 14, the bearing 42 has an inner surface which extends axially between opposite open first and second ends. A portion of the inner surface defines a curved bearing surface 44, which is curved with a generally constant diameter to present a generally spherically-shaped cavity (hereinafter referred to as the "spherical cavity 48"). As such, the curved bearing surface 44 is generally semi-spherically shaped or curved.

Referring back to FIG. 4, in the exemplary embodiment, the stud 32 is formed of one integral piece of material and extends through the bearing 42 past the opposite open ends. The stud 32 has a through passage 50 for receiving the bolt 36 to attach the stud 32 with the vehicle frame 30. As shown in FIGS. 9-12, the stud 32 has a generally ball-shaped portion (hereinafter referred to as the "ball portion 52") and a pair of end portions 54. The ball portion 52 of the stud 32 has a pair of curved surfaces 55 and a pair of recessed surfaces 56. The curved surfaces 44 are generally semi-spherical in shape in that they have a generally constant diameter which is similar to the diameter of the generally spherical cavity 48 of the bearing 42 (shown in FIGS. 13 and 14), and the recessed surfaces 56 are recessed relative to the diameter of the curved surfaces 44. That is, the curved surfaces 44 extend radially further from a central point in the ball portion 52 than the recessed surfaces 56. In the exemplary embodiment, the curved surfaces 44 are diametrically opposite of one another, and the recessed surfaces 56 are diametrically opposite of one another. In the exemplary embodiment, the recessed surfaces 56 of the ball portion 52 are generally flat in shape. However, it should be appreciated that the recessed surfaces 56 could take a range of different shapes.

Referring back to FIG. 4-6, the diameter of the curved surfaces 44 of the ball portion 52 of the stud 32 is similar to the diameter of the spherical cavity 48 (shown in FIGS. 13 and 14) of the bearing 42 to allow, thus allowing for sliding contact between the curved surfaces 44 of the stud 32 and the bearing surface 46 of the bearing 42. As shown, the ball portion 52 of the stud 32 is captured by the bearing surface 46 on both sides of an equator of the ball portion 52. That is, the single bearing 42 with the single bearing surface 46 supports both an upper hemisphere and a lower hemisphere of the ball portion 52. This enables the relative pivoting or rotation of the housing 34 relative to the stud 32 shown in FIGS. 4-6. A lubricant (not shown), such as grease, is preferably employed to provide a low friction interface between the curved surfaces 44 of the stud 32 and the bearing surface 46 of the bearing 42.

Figure 15:
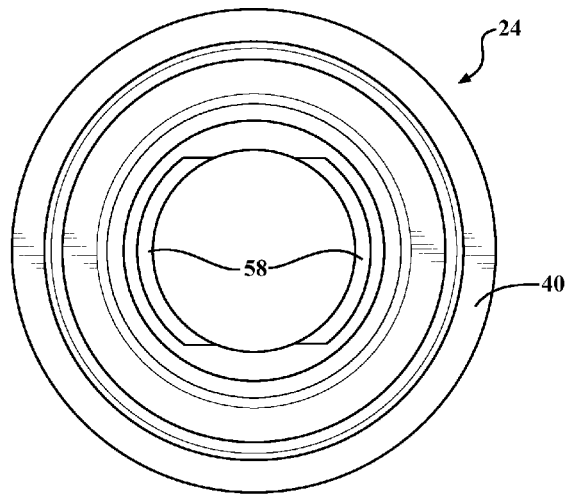
FIG. 15 is a top elevation view of the housing of FIG. 13.
Figure 16:
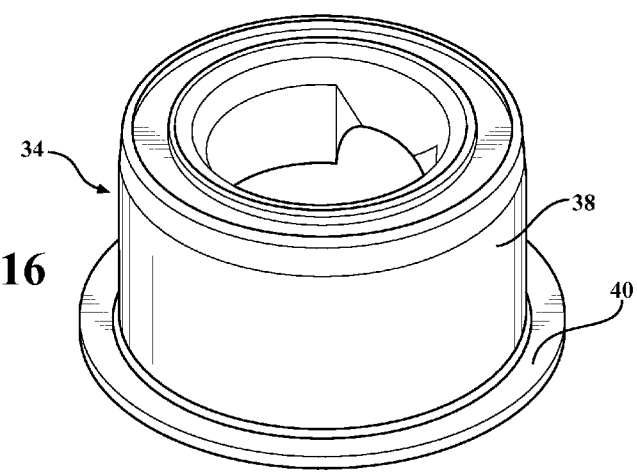
FIG. 16 is a perspective view of the housing of FIG. 13.

Referring now to FIGS. 13-16, the bearing 42 includes a passage which is shaped for guiding the ball portion 52 (shown in FIGS. 8-11) of the stud 32 into the spherical cavity 48 of the bearing 42. The passage extends axially from one of the open ends of the bearing 42 to the shaped cavity. In the exemplary embodiment, the passage is defined by a pair of slots 58 which extend to one of the open ends of the bearing 42. As such, as shown in FIG. 15, when viewed from above, the passage in the bearing 42 is generally oval in shape with a pair of long sides and a pair of curved sides.

Referring back to FIGS. 4-6, the ball joint assembly 26 further includes a pair of dust boots 60 which establish fluid-tight seals between the housing 34 and the stud 32 to hold the lubricant within the ball joint assembly 26 and also to protect the internal components of the ball joint assembly 26 from external debris. The dust boots 60 may be engaged with the stud 32 and the housing 34 through any suitable connection means.

Assembly of the ball joint assembly 26 includes separately forming the housing 34 with the integrally connected bearing 42 and the stud 32. The stud 32 is then oriented such that the curved surfaces 44 of the ball portion 52 are aligned with the slots 58 of the passage 50, and the ball portion 52 is inserted axially into the spherical cavity 48 of the bearing 42. Once the ball portion 52 of the stud 32 is received within the spherical cavity 48 of the bearing 42, then the stud 32 is rotated by relative to the housing 34, for example, by ninety degrees 90°) to slidably engage the curved surfaces 55 of the ball portion 52 with the bearing surface 44 of the bearing 42. Then, the dust boots 60 are engaged with the housing 34 and stud 32 to protect the interior of the ball joint assembly 20. This process is less laborious and less costly than the processes of assembling other known bushing assemblies.

Obviously, many modifications and variations of the present invention are possible in light of the above teachings and may be practiced otherwise than as specifically described while within the scope of the appended claims.

What is claimed is:

1. A ball joint assembly for allowing rotation of a control arm relative to a vehicle frame, comprising:
   a housing which is adapted for receipt within an opening of the control arm and which presents an opening that extends between open ends;
   a bearing having
   a curved bearing surface which surrounds a generally spherically-shaped cavity;
   a stud having an outer surface with a generally ball-shaped portion and a pair of diametrically opposing end portions, said ball-shaped portion presenting at least two curved surfaces and at least two recessed surfaces;
   said bearing presenting a passage for guiding said generally ball-shaped portion of said stud into said generally spherically-shaped cavity of said bearing, said passage including a pair of slots which extend from one of said open ends of said bearing to said generally spherically-shaped cavity;
   said generally ball-shaped portion of said stud being insertable into said generally spherically-shaped cavity of said bearing by aligning said curved surfaces of said stud with said slots of said passage such that said diametrically opposing end portions of said stud extend past said open ends of said housing; and
   said stud being rotatable while said ball-shaped portion of said stud is positioned within said spherically-shaped cavity of said bearing to establish slidable contact between said curved surfaces of said stud and said curved bearing surface of said bearing to allow pivoting of said stud relative to said bearing.

2. The ball joint assembly as set forth in claim 1 wherein said bearing and said housing are made as one integral piece.

3. The ball joint assembly as set forth in claim 1 wherein said stud has a through passage which extends between opposing first and second stud ends for receiving a fastener to connect said stud with the vehicle frame.

4. The ball joint assembly as set forth in claim 1 wherein said stud is made as one integral piece.

5. The ball joint assembly as set forth in claim 1 further including a pair of dust boots which are sealed with said housing and said stud.

6. A method of making a ball joint assembly, comprising the steps of:
   preparing a housing with an opening that extends between opposite open ends;
   a bearing presenting a curved bearing surface that surrounds a generally spherically shaped cavity, the bearing having a passage which extends from an end of the bearing to the spherically shaped cavity, and wherein the passage includes at least two slots;
   preparing a stud which includes a generally ball-shaped portion and a pair of diametrically opposed end portions, the ball-shaped portion having at least two curved surfaces and at least two recessed surfaces;
   aligning the curved surfaces of the ball-shaped portion of the stud with the slots of the passage of the bearing;
   guiding the ball shaped portion of the stud into the spherically shaped cavity of the bearing such that the end portions of the stud extend past the open ends of the housing; and
   rotating the stud relative to the bearing to establish slidable contact between the curved surfaces of the ball-shaped portion with the bearing surface of the bearing to allow pivoting of the stud relative to the bearing.

7. The method as set forth in claim 6 wherein the housing and the bearing are of one integral piece.

8. The method as set forth in claim 6 wherein the stud has a through passage for receiving a fastener to connect the stud with a vehicle frame.

9. The method as set forth in claim 6 further including the step of sealing at least one dust boot against said stud and against said housing.

10. A control arm assembly, comprising:
    a control arm body with at least one opening;
    a ball joint assembly for allowing rotation of said control arm body relative to a vehicle frame;
    said ball joint assembly including a housing that is received within said at least one opening of said control arm body and including a bearing and a stud;
    said housing extending between opposite open ends;
    said bearing having a curved bearing surface that surrounds a generally spherically-shaped cavity;
    said stud having an outer surface with a generally ball-shaped portion and a pair of diametrically opposed end portions, said ball-shaped portion including at least two curved surfaces and at least two recessed surfaces;
    said bearing presenting a passage for guiding said generally ball-shaped portion of said stud into said generally spherically-shaped cavity of said bearing, said passage including a pair of slots which extend from one of said open ends of said bearing to said generally spherically-shaped cavity;
    said generally ball-shaped portion of said stud being insertable into said generally spherically-shaped cavity of said bearing by aligning said curved surfaces of said stud with said slots of said passage such that said end portions of said stud extend past said open ends of said housing; and
    said stud being rotatable while said ball-shaped portion of said stud is positioned within said spherically-shaped cavity of said bearing to establish slidable contact between said curved surfaces of said stud and said curved bearing surface of said bearing to allow pivoting of said stud relative to said bearing.

11. The control arm assembly as set forth in claim 10 wherein said bearing and said housing are made as one integral piece.

12. The ball joint assembly as set forth in claim 10 wherein said stud has a through passage which extends between opposing first and second stud ends for receiving a fastener to connect said stud with the vehicle frame.

13. The control arm assembly as set forth in claim 10 wherein said stud is made as one integral piece.

* * * * *